(12) United States Patent
Law

(10) Patent No.: US 7,733,062 B2
(45) Date of Patent: Jun. 8, 2010

(54) INTELLIGENT BATTERY MODULE FOR MULTIMEDIA DEVICE

(76) Inventor: Hung Hi Law, Rm 505, 5/F., Goodluck Ind. Ctr., 808 Lai Chi Kok Road, Kowloon, Hong Kong (HK)

( * ) Notice: Subject to any disclaimer, the term of this patent is extended or adjusted under 35 U.S.C. 154(b) by 391 days.

(21) Appl. No.: 11/840,220

(22) Filed: Aug. 17, 2007

(65) Prior Publication Data
US 2009/0045777 A1 Feb. 19, 2009

(51) Int. Cl.
H02J 7/00 (2006.01)
G03B 7/26 (2006.01)

(52) U.S. Cl. .................. 320/134; 320/127; 396/278

(58) Field of Classification Search .......... 320/127, 320/134; 396/277, 278, 303, 539
See application file for complete search history.

(56) References Cited

U.S. PATENT DOCUMENTS 6,806,681 B1 * 10/2004 Cheiky et al. ............ 320/107
7,449,863 B2 * 11/2008 Tashiro, Kei ............ 320/112
7,521,894 B2 * 4/2009 Horii et al. ............ 320/132

* cited by examiner

Primary Examiner—Edward Tso
Assistant Examiner—Richard V Muralidar
(74) Attorney, Agent, or Firm—Tsz Lung Yeung

(57) ABSTRACT

An intelligent battery module for a multimedia device includes a device housing, a battery unit and an intelligent circuit arrangement. The intelligent circuit arrangement is provided within the device housing for electrically communicating a multimedia battery and the battery unit with a battery terminal of the multimedia device, in such a manner that when the multimedia battery is mounted onto a battery slot, the intelligent circuit arrangement is adapted to electrically connect the multimedia battery with the battery terminal so as to allow the multimedia battery to initially activate the multimedia device, and when the multimedia device is initially activated by the multimedia battery, the intelligent circuit arrangement is arranged to electrically connect the battery unit with the battery terminal so as to allow the multimedia device to be continuously operated by the battery unit without electrically further recourse to electricity supply of the multimedia battery.

23 Claims, 10 Drawing Sheets

INTELLIGENT BATTERY MODULE FOR MULTIMEDIA DEVICE

BACKGROUND OF THE PRESENT INVENTION

1. Field of Invention

The present invention relates to a multimedia device, and more particularly to an intelligent battery module for a multimedia device which is arranged to provide extended electrical power supply to the multimedia device through at least one battery unit which is not the official designated battery pack for the multimedia device.

2. Description of Related Arts

Portable multimedia devices, such as camcorders, have widely been utilized around the world. People may use camcorders for capturing images and for recording videos. A conventional camcorder usually comprises a main camcorder unit and an "official" battery pack detachably mounted on the main camcorder unit for providing electric supply to operate the main camcorder unit. The "official" battery pack is usually a battery unit fabricated by the manufacturer or is licensed to be fabricated by a battery manufacturer other than the manufacturer of the main camcorder unit.

Due to a number of complicated technical, marketing and perhaps legal reasons, the "official" battery pack is usually made to be the only available kind of battery unit for that particular model of camcorders. For example, if the manufacturer, in the course of developing a new model of camcorder, decides that camcorder should be equipped with a particular model of battery unit, that particular model of battery unit will become the "official" battery pack of that new model of camcorder. Based on this objective, the microprocessor in the newly developed camcorder will be pre-programmed to allow only the battery pack which has the corresponding electrical parameters to activate the main camcorder unit. For some high-end products, the "official" battery pack may actually be a smart battery pack having an integrated built-in circuit controlling and monitoring the battery unit and communicating with the multimedia device which the battery unit pack intends to operate. The communication between the "official" battery pack and the multimedia device may include model number, manufacturer, characteristics, discharge rate etc.

The above mentioned scenario imparts a great deal of inconvenience to users of conventional camcorders. First of all, the users cannot select battery unit of other brands so that when they need to buy a spare battery pack, they need to go to specified service centers or electronic retailers for buy particular model of "official" battery pack. When the service centers or electronic retailers having that "official" battery pack is far away from the user's home, the user must travel a long distance or buy the battery pack online. The latter involves substantial order processing time, posting time and postage and packaging cost.

Second, since the "official" battery pack is usually manufactured by the same manufacturer making the multimedia devices or a licensed manufacturer, the price of the battery pack is solely determined by the corresponding manufacturer irrespective of market condition and competition. Very often, this leads to an unreasonably elevated retail price of a spare "official" battery pack. This market phenomenon is also noticeable in other industries.

Third, the above mentioned problems are further exacerbated by the fact that after the camcorders have been launched in the market for a certain period of time, the manufacturer may consider stopping producing the "official" battery pack with a view to force existing users to buy a new model. Thus, when original battery pack is underperforming, the users may wish to replace the original battery pack with a new "official" battery pack. Yet if the corresponding manufacturer stops manufacturing that particular model of battery pack, the user has no option but to purchase a new model of the multimedia device. In other words, the users may replace the entire multimedia device just because the original or the "official" battery pack is not working. This phenomenon is highly undesirable on the part of consumers. As a result, there is an exigency for completely resolving the above mentioned problems.

SUMMARY OF THE PRESENT INVENTION

A main object of the present invention is to provide an intelligent battery device for a multimedia device which is arranged to provide extended electrical power supply to the multimedia device through at least one battery unit which is not the official designated battery pack for that multimedia device.

Another object of the present invention is to provide an intelligent battery device which is conveniently portable for providing additional battery unit for a multimedia device. In other words, the above-mentioned shortcomings for the conventional multimedia "official" battery pack can be substantially overcome.

Another object of the present invention is to provide an intelligent battery device which is compatible with a wide range of multimedia devices so as to facilitate extensive application of the present invention.

Another object of the present invention is to provide an intelligent battery device which does not involve sophisticated and expensive electrical and electronics components so as to keep the manufacturing cost of the present invention an optimally minimum level, such that the present invention is affordable to the majority of the general public.

Accordingly, in order to accomplish the above objects, the present invention provides an intelligent battery device for a multimedia device which has a battery terminal and is operated by a designated multimedia battery, wherein the battery device comprises:

a device housing, having a battery slot formed thereon, adapted for detachably mounting onto the multimedia device, wherein the multimedia battery is adapted for mounting onto the battery slot;

at least one battery unit received within the device housing; and an intelligent circuit arrangement provided within the device housing for electrically communicating the multimedia battery and the battery unit with the battery terminal of the multimedia device, in such a manner that when the multimedia battery is mounted onto the battery slot, the intelligent circuit arrangement is adapted to electrically connect the multimedia battery with the battery terminal so as to allow the multimedia battery to initially activate the multimedia device, and when the multimedia device is initially activated by the multimedia battery, the intelligent circuit arrangement is arranged to electrically connect the battery unit with the battery terminal so as to allow the multimedia device to be continuously operated by the battery unit without electrically further recourse to electricity supply of the multimedia battery.

The above mentioned objectives, features, and advantages of the present invention will be more clearly described and shown in the following detailed description, drawings, and the claims.

DETAILED DESCRIPTION OF THE PREFERRED EMBODIMENT

Figure 1:
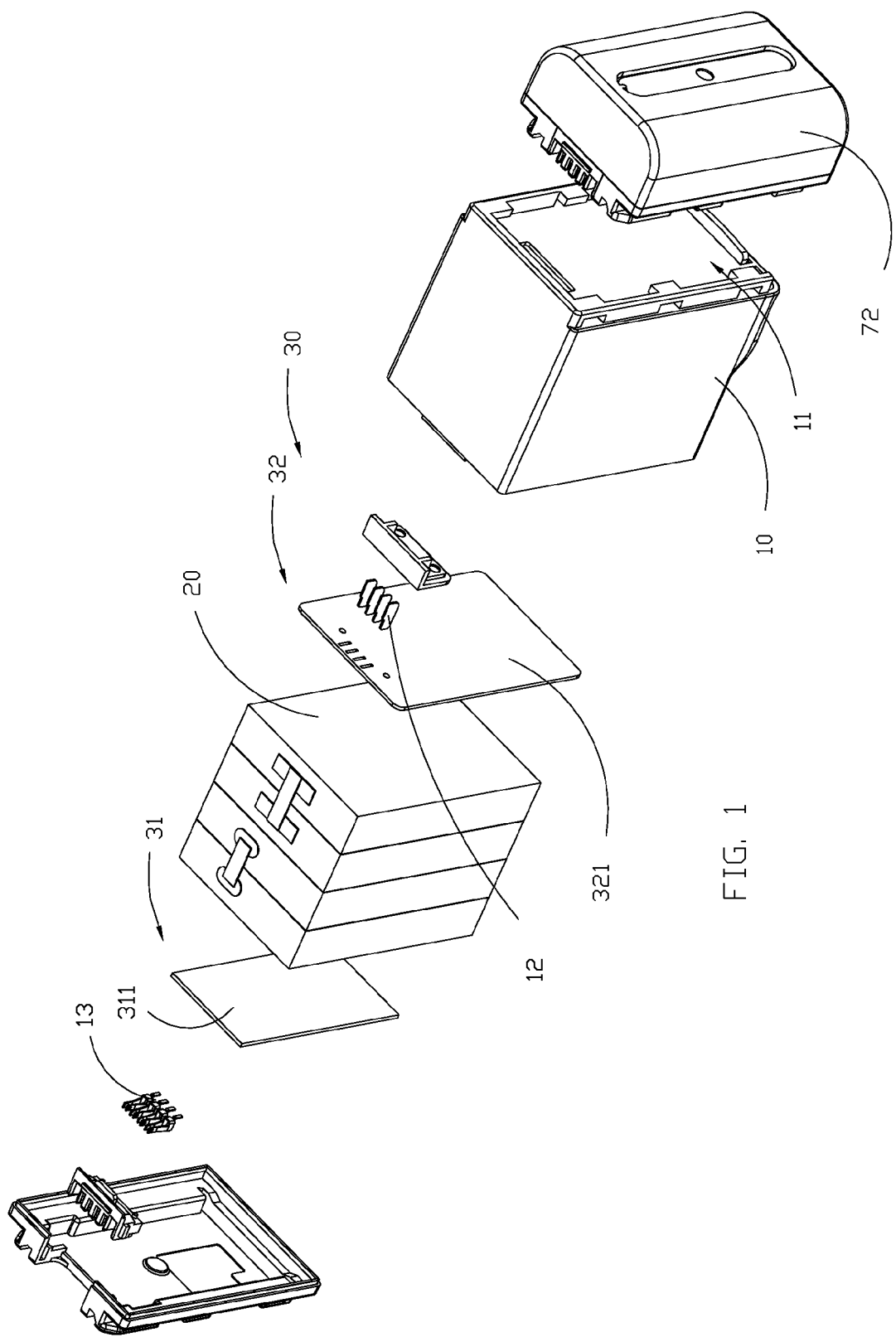
FIG. 1 is an exploded perspective view of the intelligent battery device according to the above preferred embodiment of the present invention.
Figure 2A:
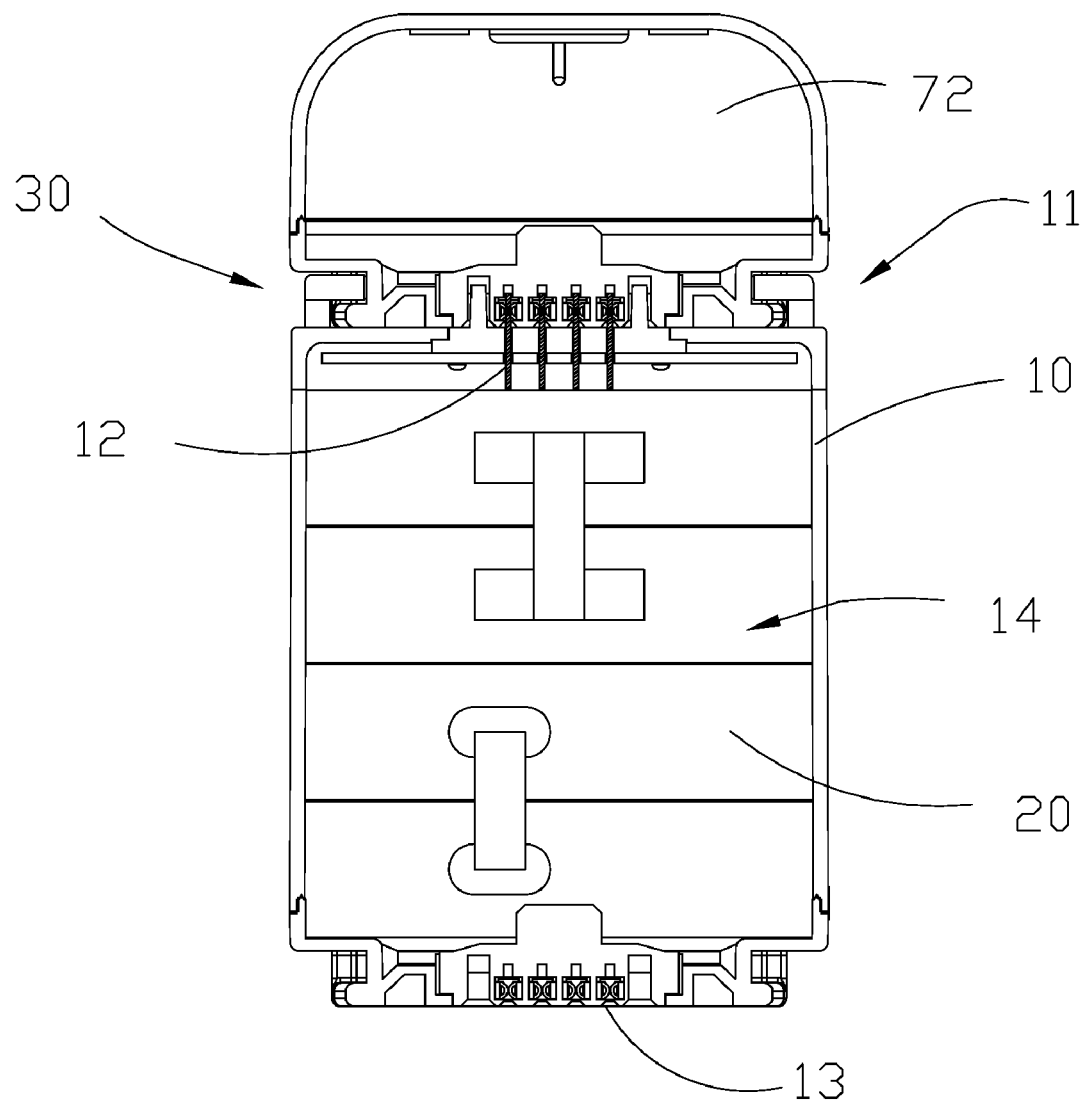
FIGS. 2A to 2C are sectional side views of the intelligent battery device according to the above preferred embodiment of the present invention.
Figure 2B:
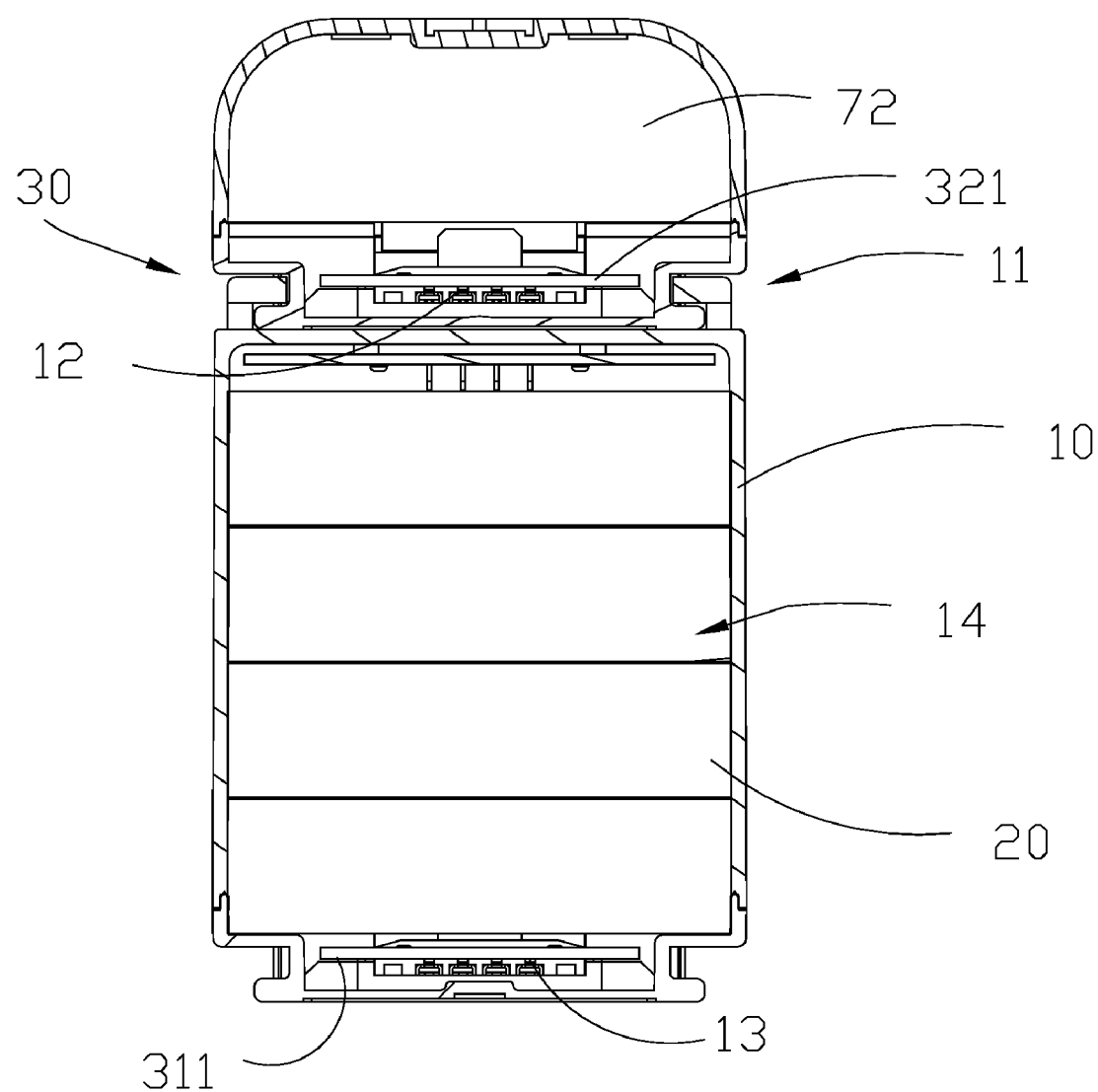
Figure 2C:
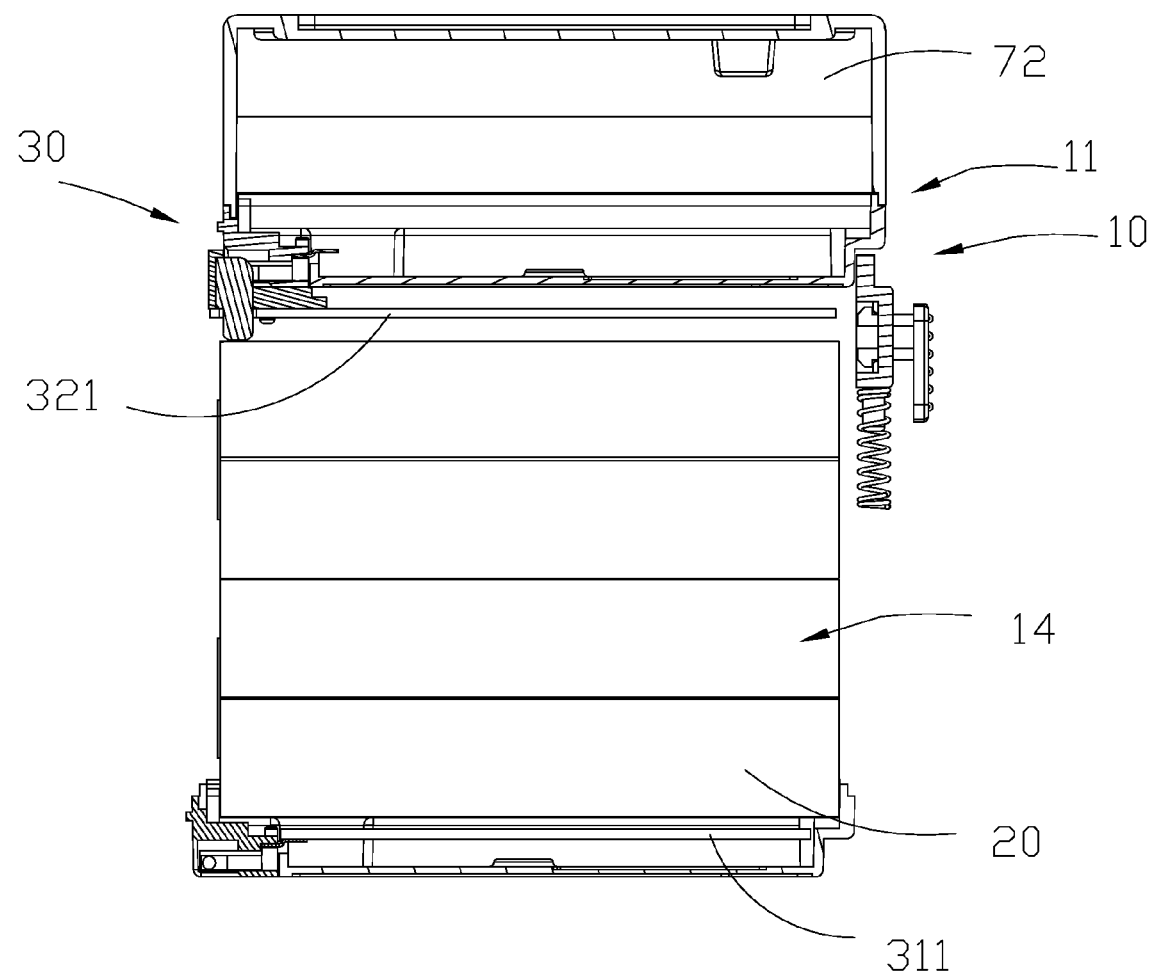
Figure 3A:
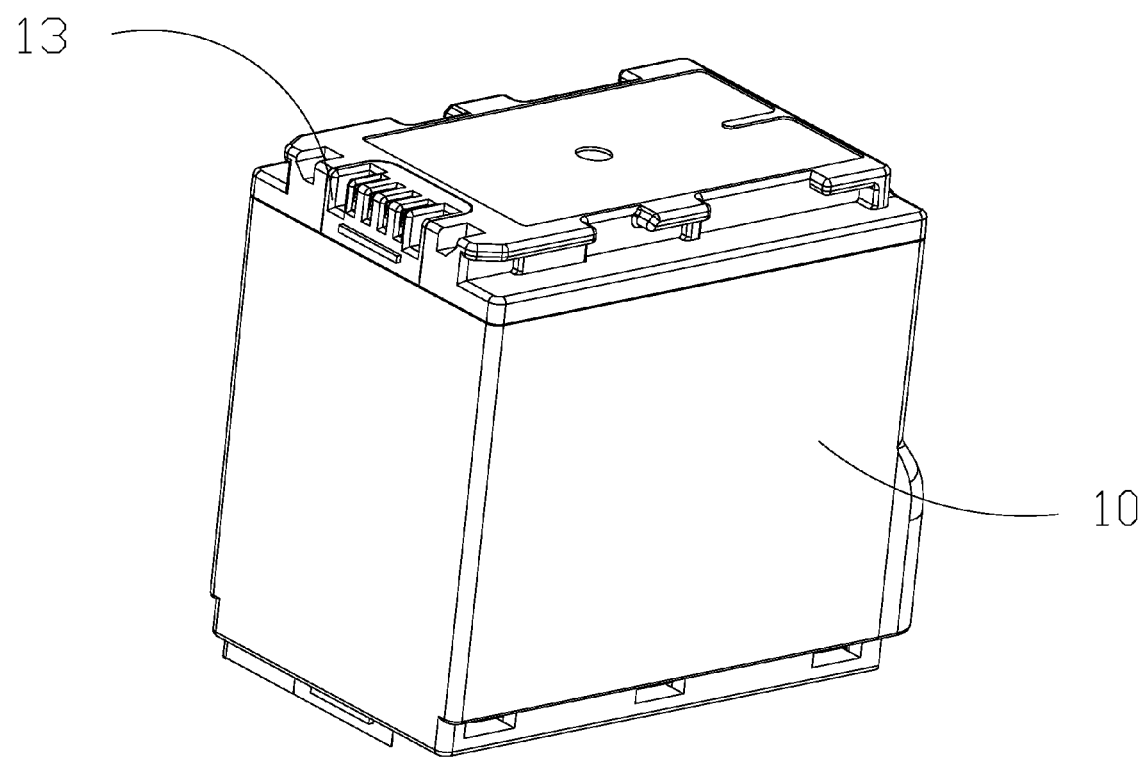
FIG. 3A and FIG. 3B are perspective views of the intelligent battery device according to the above preferred embodiment of the present invention.
Figure 3B:
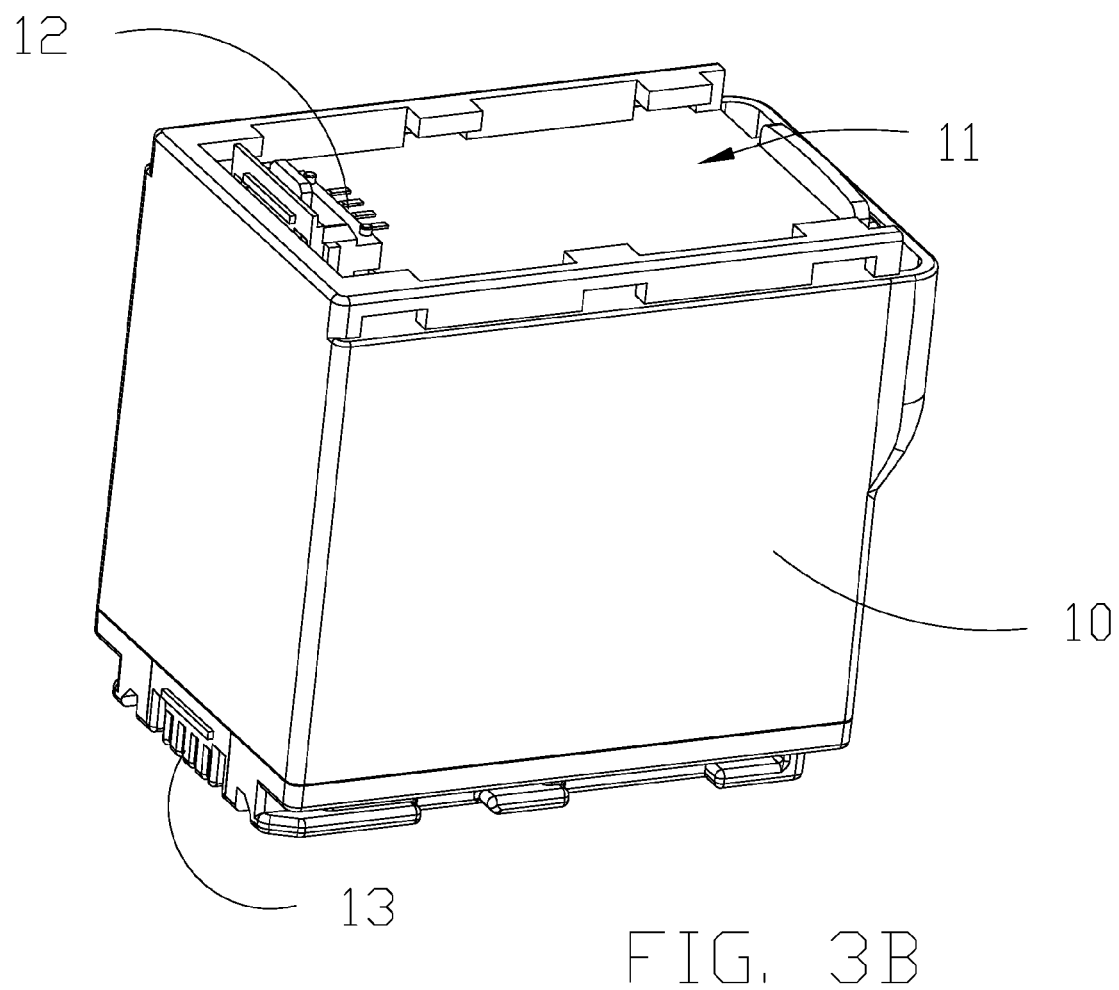
Figure 4:
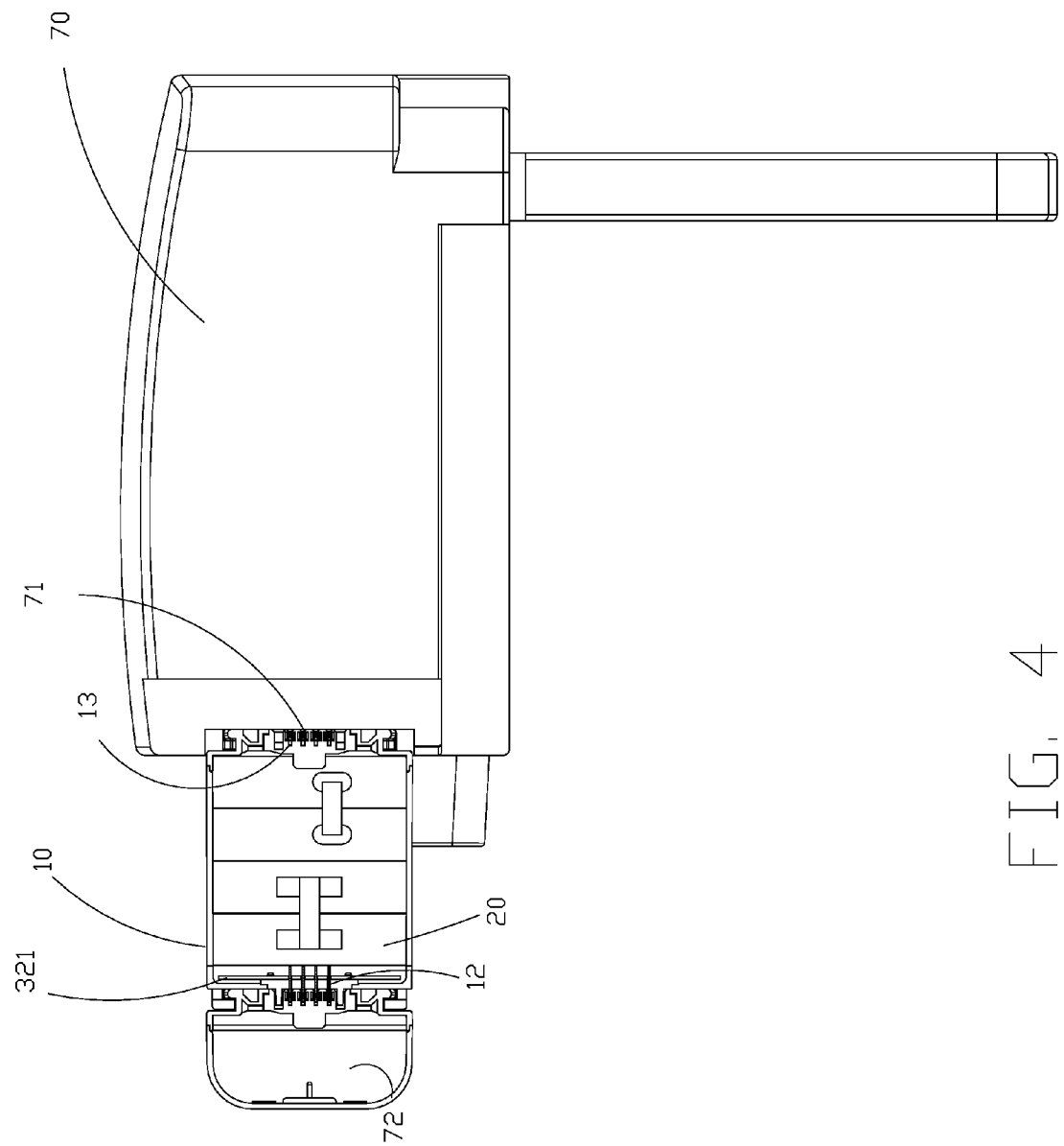
FIG. 4 is a side view of the intelligent battery device according to the above preferred embodiment of the present invention.

Referring to FIG. 1 to FIG. 7 of the drawings, an intelligent battery device according to a preferred embodiment of the present invention is illustrated, in which the intelligent battery device comprises a device housing 10, at least one battery unit 20 such as a rechargeable battery or a conventional alkaline battery cell, and an intelligent circuit arrangement 30. The intelligent battery device is for a multimedia device 70 which has a battery terminal 71 and is operated by a designated multimedia battery 72. The designated multimedia battery 72 is usually a smart battery unit having a built-in integrated control circuit for electrically communicating with the multimedia device 70 when it is used for providing electrical power thereto.

The device housing 10, having a battery slot 11 formed on an outer side thereof, adapted for detachably mounting onto the multimedia device 70, wherein the multimedia battery 72 is adapted for mounting onto the battery slot 11. Furthermore, the battery unit 20 is received within the device housing 10.

The intelligent circuit arrangement 30 is provided within the device housing 10 for electrically communicating the multimedia battery 72 and the battery unit 20 with the battery terminal 71 of the multimedia device 70, in such a manner that when the multimedia battery 72 is mounted onto the battery slot 11, the intelligent circuit arrangement 30 is adapted to electrically connect the multimedia battery 72 with the battery terminal 71 so as to allow the multimedia battery 72 to initially activate the multimedia device 70, and when the multimedia device 70 is initially activated by the multimedia battery 72, the intelligent circuit arrangement 30 is arranged to electrically connect the battery unit 20 with the battery terminal 71 so as to allow the multimedia device 70 to be continuously operated by the battery unit 20 without electrically further recourse to electricity supply of the multimedia battery 72.

According to the preferred embodiment of the present invention, the device housing 10 has a plurality of multimedia battery terminals 12 spacedly provided on the battery slot 11 for electrically connecting with the multimedia battery 72 designated for use with the multimedia device 70, and a plurality of device terminals 13 formed on an inner side of the device housing 10 for electrically connecting with the battery terminal 71 of the multimedia device 70, wherein the intelligent circuit arrangement 30 and the battery unit 20 are electrically connected between the multimedia battery terminals 12 and the device terminals 13 for optimally controlling the electrical connection between the battery unit 20, the multimedia battery 72 with the multimedia device 70. Moreover, the device housing 10 further has a receiving cavity 14 formed therein for securely storing the battery unit 20 and the intelligent circuit arrangement 30.

The battery unit 20 is preferably embodied as a conventional battery unit which is electrically connected with the intelligent circuit arrangement 30 and the and the battery terminal 71 of the multimedia device 70 for supplying electrical power to the multimedia device 70 as controlled by the intelligent circuit arrangement 30. It is worth mentioning that the battery unit 20 should have battery parameters (e.g. voltage, current etc.) which are substantially the same as the multimedia battery 72 so that when the intelligent circuit arrangement 30 electrically connects the battery unit 20 with the multimedia device 70, the battery unit 20 is capable of effectively supplying electrical power to the multimedia device 70 without incurring accidental damage to the multimedia device 70.

The intelligent circuit arrangement 30 comprises a first and a second power circuitry 31, 32 disposed within the receiving cavity 14 of the device housing 10 to electrically connect the multimedia battery 72 and the battery unit 20 with the multimedia device 70 via the device terminals 13. More specifically, the first power circuitry 31 comprises a first circuit board 311 having a first battery circuit 312 formed thereon for electrically connecting the battery unit 20 with the multimedia device 70 via the device terminals 13.

According to the preferred embodiment of the present invention, the first battery circuit 312 comprises means (hereafter called electricity supply means) for providing a controlled and continuous electricity supply to the multimedia device 70 after the multimedia device 70 has been initially activated by the multimedia battery 72. In other words, when the multimedia device 70 has been initially activated by the multimedia battery 72, the first battery circuit 312 comes into play for providing continuous electricity supply to the multimedia device 70 without further recourse to electricity supply from the multimedia battery 72. It is worth mentioning, however, that an electrical communication between the multimedia battery 72 and the multimedia device 70 must be maintained throughout the entire operation in order to ensure that the battery unit 20 can continuously supply electrical energy to the multimedia device 70, which is pre-programmed to recognize a predetermined communication protocol or password from the multimedia battery 72. In other words, the present invention utilizes the predetermined communication protocols between the multimedia device 70 and the multimedia battery 72 to make the multimedia device 70 recognize that the electricity comes from a legitimate source (i.e. from the multimedia battery 72), and when the multimedia device 70 is operated, the electrical power from the battery unit 20 is arrange to supersede the electrical power provided by the multimedia battery 72 and allow the multimedia device 70 to be continuously operated by the battery unit 20, even if the multimedia battery 72 subsequently runs out of electrical power. There must be a continuous signal communication between the multimedia device 70 and the multimedia battery 72 for ensuring that the multimedia device 70 continues to connect with the battery unit 20 as though it is electrically connected with the multimedia battery 72.

Figure 5:
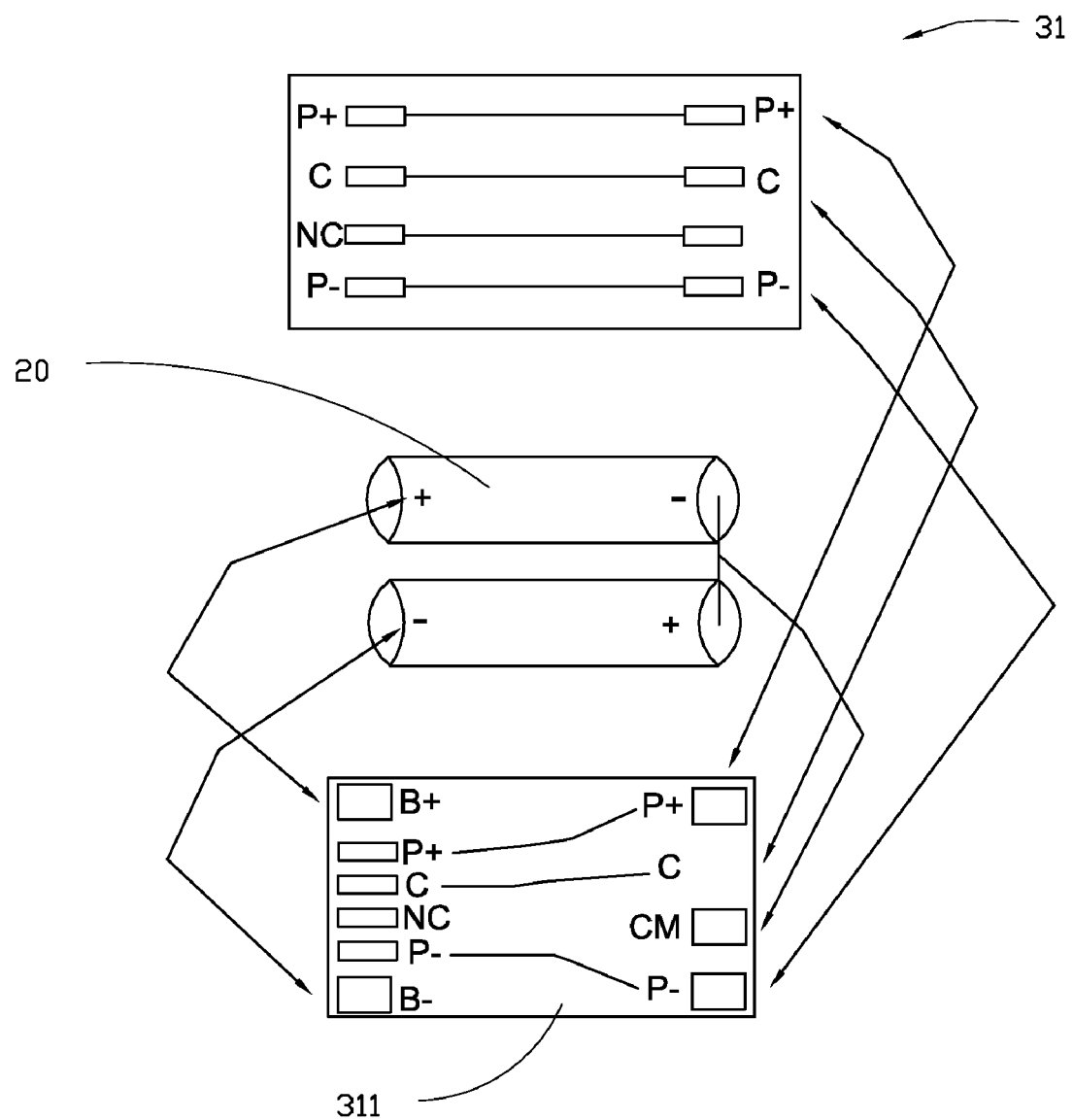
FIG. 5 is a schematic diagram of the intelligent battery device according to the above preferred embodiment of the present invention, illustrating the intelligent circuit arrangement.
Figure 6:
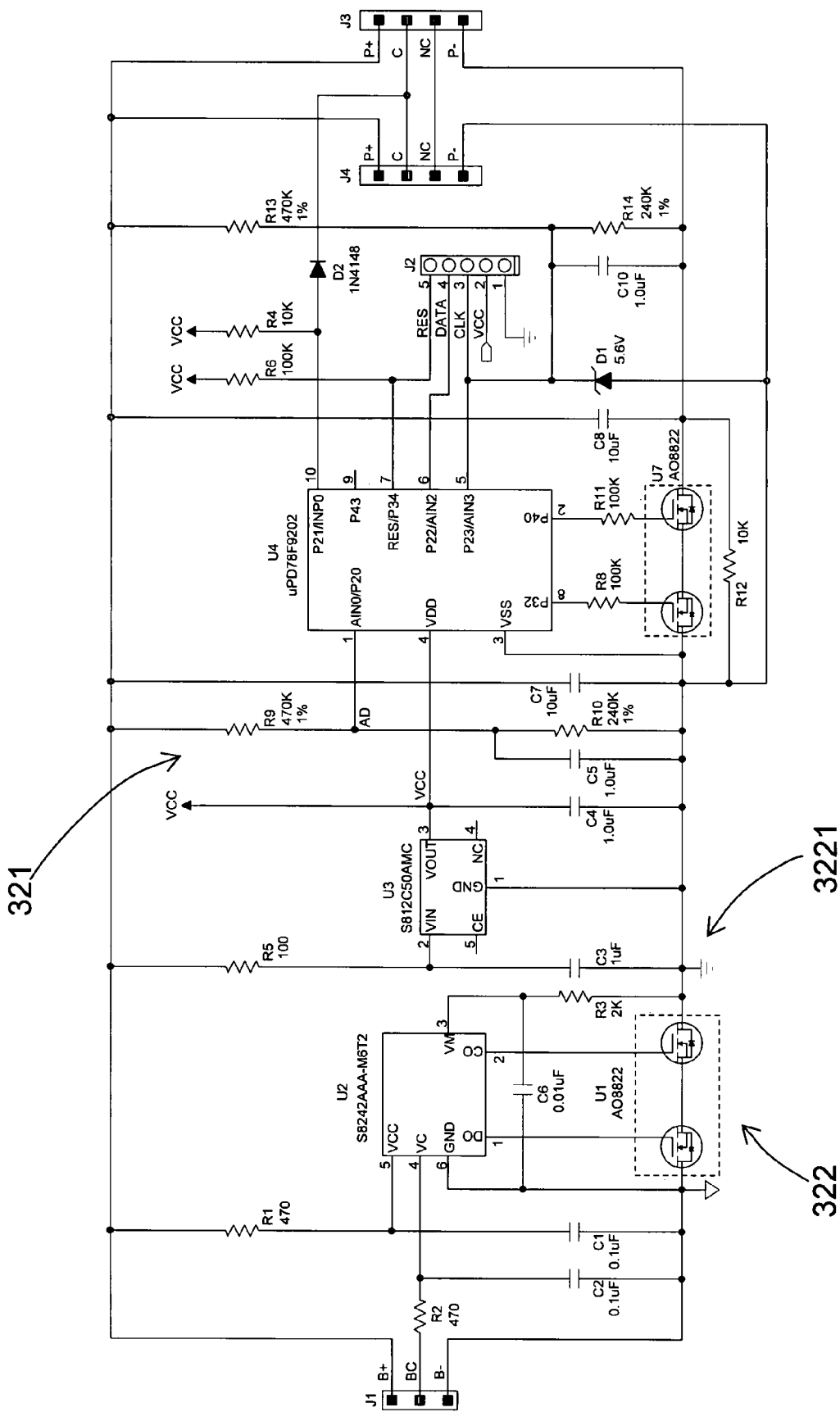
FIG. 6 is a circuit diagram of the intelligent battery device according to the above preferred embodiment of the present invention.

Referring to FIG. 5 and FIG. 6 of the drawings, the electricity supply means comprises an first integrated circuit U4 and a second integrated circuit U3 electrically connected to the integrated circuit U4 for supply electrical energy thereto. The first integrated circuit U4 is pre-programmed to control the battery various parameters of the battery unit 20 via the second connecting port J2 so as to activate the battery unit 20 to supply controlled and continuous electrical energy to the multimedia device 70 via a fourth connecting port J4. The electricity supply means further comprises a third integrated circuit U7 electrically connecting with the first integrated circuit U4 for managing an electricity level of the battery unit 20 in light of the difference in electricity level between the battery unit 20 and the multimedia battery 72 via a third connecting port J3. The first integrated circuit U4 and the third integrated circuit U7 serve to generate a stabilized and optimal electricity level of the battery unit 20 and the multimedia battery 72 so as to maximize the efficiency of the present invention when supply electrical power to the multimedia device 70. Moreover, a balanced and stabilized electricity level both in the multimedia battery 72 and the battery unit 20 result in maximized life span of both batteries.

The first battery circuit 312 further comprises means (hereafter called connecting means) for electrically connecting the multimedia battery 70 with the multimedia device 70 for allowing the multimedia device 70 to be initially activated by the multimedia battery 72. When the multimedia device 70 has been initially activated by the multimedia battery 72, the first battery circuit 312 comes into play for providing continuous electricity supply to the multimedia device 70 without further recourse to the electrical power of the multimedia battery 72.

The connecting means comprises the first integrated circuit U4 and a third integrated circuit U7 electrically connecting with the battery unit, 20 the first power circuitry 31 and the multimedia battery 72 in such a manner that the multimedia battery 72 is allowed to electrically connect with the multimedia device 70 via the first integrated circuit U4 for initially activating the multimedia device 70 by the multimedia battery 72. After that the first battery circuit 312 comes into play for providing continuous electricity supply to the multimedia device 70 without further recourse to the electrical power of the multimedia battery 72, again as controlled by the first integrated circuit U4.

On the other hand, the second power circuitry 32 comprises a second circuit board 321 having a second battery circuit 322 formed thereon for electrically connecting with the first circuit board 311 and the multimedia battery 72 via the multimedia battery terminals 12. The second battery circuit 322 comprises a battery management circuitry 3221 provided in the receiving cavity 14 of the housing device 10 and is electrically connected with the battery unit 20 and the first battery circuit 311 in such a manner that the battery management circuitry 3221 is adapted to control and facilitate recharging and discharge of the battery unit 20. Thus, the battery management circuitry 3221 comprises means (hereafter called recharging means) for controlling recharge and discharge of the battery unit 20 in a protective manner for ensuring adequate and safe supply of electricity to the multimedia device 70. As shown in FIG. 5 of the drawings, the recharging means comprises a fourth and a fifth integrated circuit U1 and U2 electrically connected with the battery unit 20 via a first connecting port J1 for controlling recharge of the battery unit 20 in a secure manner. The fourth and the fifth integrated circuit U1 and U2 are arranged to protect the battery unit from being over recharged and discharged so as to ensure safe operation of the present invention.

Figure 7:
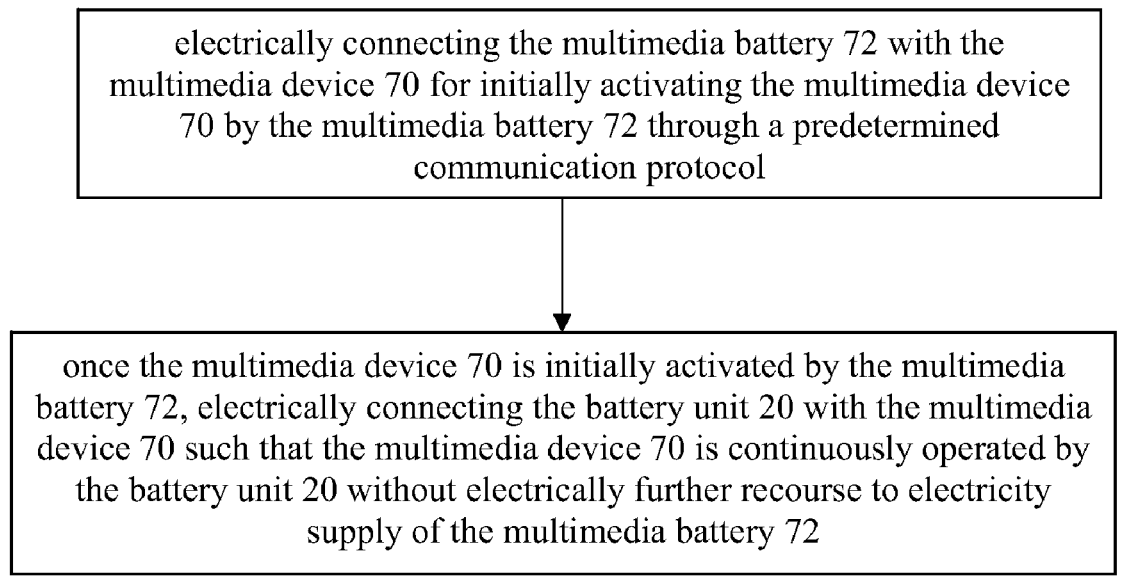
FIG. 7 is a method of providing an extended electricity supply to a multimedia device according to the above preferred embodiment of the present invention.

Referring to FIG. 7 of the drawings, the present invention also provides a method of providing an extended electricity supply to a multimedia device 70 which has a battery terminal 71 and is normally operated by a designated multimedia battery 72, comprising the steps of:

(a) electrically connecting the multimedia battery 72 with the multimedia device 70 for initially activating the multimedia device 70 by the multimedia battery 72 through a predetermined communication protocol between the multimedia device 70 and the multimedia battery 72; and (b) once the multimedia device 70 is initially activated by the multimedia battery 72, electrically connecting the battery unit 20 with the multimedia device 70 such that the multimedia device 70 is continuously operated by the battery unit 20 without electrically further recourse to electricity supply of the multimedia battery 72, while retaining the communication protocol between the between the multimedia device 70 and the multimedia battery 72.

One skilled in the art will appreciate that the embodiment of the present invention as shown in the drawings and described above is illustrative only and not intended to be limiting. All embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An intelligent battery device for a multimedia device which has a battery terminal and is operated by a designated multimedia battery having predetermined communication protocols exchanging with said multimedia device, wherein said battery device comprises:

a device housing, having a battery slot formed thereon, adapted for detachably mounting onto said multimedia device, wherein said multimedia battery is adapted for mounting onto said battery slot;

at least one battery unit received within said device housing; and an intelligent circuit arrangement provided within said device housing for electrically communicating said multimedia battery and said battery unit with said battery terminal of said multimedia device, in such a manner that when said multimedia battery is mounted onto said battery slot, said intelligent circuit arrangement is adapted to electrically connect said multimedia battery with said battery terminal so as to allow said multimedia battery to initially activate said multimedia device, and when said multimedia device is initially activated by said multimedia battery, said intelligent circuit arrangement is arranged to electrically connect said battery unit with said battery terminal so as to allow said multimedia device to be continuously operated by said battery unit without electrically further recourse to electricity supply of said multimedia battery while maintaining said communication protocols between said multimedia device and said multimedia battery.

2. The battery device, as recited in claim 1, wherein said device housing has a receiving cavity formed therein for storing said intelligent circuit arrangement and said battery unit, a plurality of multimedia battery terminals spacedly provided on said battery slot for electrically connecting with said multimedia battery, and a plurality of device terminals formed on an inner side of the device housing for electrically connecting with said battery terminal of said multimedia device, wherein said intelligent circuit arrangement and said battery unit are electrically connected between said multimedia battery terminals and said device terminals for optimally controlling said electrical connection between said battery unit, said multimedia battery with said multimedia device.

3. The battery device, as recited in claim 1, wherein said intelligent circuit arrangement comprises a first and a second power circuitry disposed within said device housing to electrically connect said multimedia battery and said battery unit with said multimedia device, wherein said first power circuitry comprises a first battery circuit for electrically connecting said battery unit with said multimedia device, and said second power circuitry comprises a second battery circuit for electrically connecting with said first power circuitry and said multimedia battery.

4. The battery device, as recited in claim 2, wherein said intelligent circuit arrangement comprises a first and a second power circuitry disposed within said device housing to electrically connect said multimedia battery and said battery unit with said multimedia device via said device terminals, wherein said first power circuitry comprises a first battery circuit for electrically connecting said battery unit with said multimedia device, and said second power circuitry comprises a second battery circuit for electrically connecting with said first power circuitry and said multimedia battery via said multimedia battery terminals.

5. The battery device, as recited in claim 3, wherein said first battery circuit comprises means for providing a controlled and continuous electricity supply to said multimedia device after said multimedia device is initially activated by said multimedia battery.

6. The battery device, as recited in claim 4, wherein said first battery circuit comprises means for providing a controlled and continuous electricity supply to said multimedia device after said multimedia device is initially activated by said multimedia battery.

7. The battery device, as recited in claim 5, wherein said first battery circuit further comprises means for electrically connecting said multimedia battery with said multimedia device for allowing said multimedia device to be initially activated by said multimedia battery.

8. The battery device, as recited in claim 6, wherein said first battery circuit further comprises means for electrically connecting said multimedia battery with said multimedia device for allowing said multimedia device to be initially activated by said multimedia battery.

9. The battery device, as recited in claim 5, wherein said second battery circuit comprises a battery management circuitry provided in said receiving cavity of said housing device and is electrically connected with said battery unit and said first battery circuit in such a manner that said battery management circuitry is adapted to control and facilitate recharging and discharge of said battery unit, wherein said battery management circuitry comprises means for controlling recharge and discharge of said battery unit in a protective manner for ensuring adequate and safe supply of electricity to said multimedia device by at least said battery unit.

10. The battery device, as recited in claim 6, wherein said second battery circuit comprises a battery management circuitry provided in said receiving cavity of said housing device and is electrically connected with said battery unit and said first battery circuit in such a manner that said battery management circuitry is adapted to control and facilitate recharging and discharge of said battery unit, wherein said battery management circuitry comprises means for controlling recharge and discharge of said battery unit in a protective manner for ensuring adequate and safe supply of electricity to said multimedia device by at least said battery unit.

11. The battery device, as recited in claim 7, wherein said second battery circuit comprises a battery management circuitry provided in said receiving cavity of said housing device and is electrically connected with said battery unit and said first battery circuit in such a manner that said battery management circuitry is adapted to control and facilitate recharging and discharge of said battery unit, wherein said battery management circuitry comprises means for controlling recharge and discharge of said battery unit in a protective manner for ensuring adequate and safe supply of electricity to said multimedia device by at least said battery unit.

12. The battery device, as recited in claim 8, wherein said second battery circuit comprises a battery management circuitry provided in said receiving cavity of said housing device and is electrically connected with said battery unit and said first battery circuit in such a manner that said battery management circuitry is adapted to control and facilitate recharging and discharge of said battery unit, wherein said battery management circuitry comprises means for controlling recharge and discharge of said battery unit in a protective manner for ensuring adequate and safe supply of electricity to said multimedia device by at least said battery unit.

13. An intelligent battery device for electrically controlling at least one battery unit to provide electricity to a multimedia device which has a battery terminal and is operated by a designated multimedia battery, wherein said battery device comprises:

a device housing, having a battery slot formed thereon, adapted for detachably mounting onto said multimedia device, wherein said multimedia battery is adapted for mounting onto said battery slot; and an intelligent circuit arrangement provided within said device housing for electrically communicating said multimedia battery and said battery unit with said battery terminal of said multimedia device, in such a manner that when said multimedia battery is mounted onto said battery slot, said intelligent circuit arrangement is adapted to electrically connect said multimedia battery with said battery terminal so as to allow said multimedia battery to initially activate said multimedia device, and when said multimedia device is initially activated by said multimedia battery, said intelligent circuit arrangement is arranged to electrically connect said battery unit with said battery terminal so as to allow said multimedia device to be continuously operated by said battery unit without electrically further recourse to electricity supply of said multimedia battery.

14. The battery device, as recited in claim 13, wherein said device housing has a receiving cavity formed therein for storing said intelligent circuit arrangement and said battery unit, a plurality of multimedia battery terminals spacedly provided on said battery slot for electrically connecting with said multimedia battery, and a plurality of device terminals formed on an inner side of the device housing for electrically connecting with said battery terminal of said multimedia device, wherein said intelligent circuit arrangement and said battery unit are electrically connected between said multimedia battery terminals and said device terminals for optimally controlling said electrical connection between said battery unit, said multimedia battery with said multimedia device.

15. The battery device, as recited in claim 13, wherein said intelligent circuit arrangement comprises a first and a second power circuitry disposed within said device housing to electrically connect said multimedia battery and said battery unit with said multimedia device, wherein said first power circuitry comprises a first battery circuit for electrically connecting said battery unit with said multimedia device, and said second power circuitry comprises a second battery circuit for electrically connecting with said first power circuitry and said multimedia battery.

16. The battery device, as recited in claim 14, wherein said intelligent circuit arrangement comprises a first and a second power circuitry disposed within said device housing to electrically connect said multimedia battery and said battery unit with said multimedia device via said device terminals, wherein said first power circuitry comprises a first battery circuit for electrically connecting said battery unit with said multimedia device, and said second power circuitry comprises a second battery circuit for electrically connecting with said first power circuitry and said multimedia battery via said multimedia battery terminals.

17. The battery device, as recited in claim 15, wherein said first battery circuit comprises means for providing a controlled and continuous electricity supply to said multimedia device after said multimedia device is initially activated by said multimedia battery.

18. The battery device, as recited in claim 16, wherein said first battery circuit comprises means for providing a controlled and continuous electricity supply to said multimedia device after said multimedia device is initially activated by said multimedia battery.

19. The battery device, as recited in claim 17, wherein said first battery circuit further comprises means for electrically connecting said multimedia battery with said multimedia device for allowing said multimedia device to be initially activated by said multimedia battery.

20. The battery device, as recited in claim 18, wherein said first battery circuit further comprises means for electrically connecting said multimedia battery with said multimedia device for allowing said multimedia device to be initially activated by said multimedia battery.

21. The battery device, as recited in claim 19, wherein said second battery circuit comprises a battery management circuitry provided in said receiving cavity of said housing device and is electrically connected with said battery unit and said first battery circuit in such a manner that said battery management circuitry is adapted to control and facilitate recharging and discharge of said battery unit, wherein said battery management circuitry comprises means for controlling recharge and discharge of said battery unit in a protective manner for ensuring adequate and safe supply of electricity to said multimedia device by at least said battery unit.

22. The battery device, as recited in claim 20, wherein said second battery circuit comprises a battery management circuitry provided in said receiving cavity of said housing device and is electrically connected with said battery unit and said first battery circuit in such a manner that said battery management circuitry is adapted to control and facilitate recharging and discharge of said battery unit, wherein said battery management circuitry comprises means for controlling recharge and discharge of said battery unit in a protective manner for ensuring adequate and safe supply of electricity to said multimedia device by at least said battery unit.

23. A method of providing an extended electricity supply to a multimedia device which has a battery terminal and is normally operated by a designated multimedia battery, comprising the steps of:
(a) electrically connecting said multimedia battery with said multimedia device for initially activating said multimedia device by said multimedia battery through a predetermined communication protocol between said multimedia device and said multimedia battery; and
(b) once said multimedia device is initially activated by said multimedia battery, electrically connecting a battery unit with said multimedia device such that said multimedia device is continuously operated by said battery unit without electrically further recourse to electricity supply of said multimedia battery, while retaining said communication protocol between said multimedia device and said multimedia battery.

* * * * *